United States Patent [19]

Krijgsman

[11] 4,366,121
[45] Dec. 28, 1982

[54] SYSTEM FOR FORMING A REACTION PRODUCT SUCH AS CALCIUM SILICATE

[75] Inventor: Pieter Krijgsman, Wapenveld, Netherlands

[73] Assignee: Warrior Insulation Company B. V., Emmen, Netherlands

[21] Appl. No.: 163,729

[22] Filed: Jun. 27, 1980

Related U.S. Application Data

[62] Division of Ser. No. 12,886, Feb. 18, 1979, Pat. No. 4,238,240.

[30] Foreign Application Priority Data

Sep. 21, 1978 [NL] Netherlands ............... 7809621

[51] Int. Cl.³ .................... B01J 3/04; G05D 7/00
[52] U.S. Cl. .................... 422/110; 422/112
[58] Field of Search .................. 422/110–113, 422/208, 226; 137/12, 208, 210

[56] References Cited

U.S. PATENT DOCUMENTS

| | | | |
|---|---|---|---|
| 2,582,899 | 1/1952 | Barnebey et al. | 422/193 |
| 2,863,737 | 12/1958 | Green | 422/111 |
| 2,918,074 | 12/1959 | Taplin | 422/112 |
| 3,525,596 | 8/1970 | Grant, Jr. | 422/110 |
| 3,672,009 | 6/1972 | Pike | 422/208 |
| 3,816,149 | 6/1974 | Zettel | 106/120 |
| 4,131,638 | 12/1978 | Whitaker et al. | 106/120 |

FOREIGN PATENT DOCUMENTS

| | | |
|---|---|---|
| 601124 | 11/1959 | Canada. |
| 1462242 | 1/1977 | United Kingdom. |
| 2000753 | 1/1979 | United Kingdom. |

Primary Examiner—David L. Lacey
Attorney, Agent, or Firm—Alan H. MacPherson; Steven F. Caserza; Richard Franklin

[57] ABSTRACT

A system for forming a reaction product such as calcium silicate comprises an autoclave for receiving the reaction constituents and for reacting these constituents to form a reaction product, a holding vessel for receiving the reaction product and a flow passage connecting the autoclave to the holding vessel and for allowing the passage of the reaction product from the autoclave to the holding vessel. The flow passage includes a heat exchanger for transferring heat from the reaction product during its passage through the flow passage to another medium. The system includes an electronic control system for maintaining the pressure in the holding vessel a controlled amount beneath the pressure in the autoclave during the transfer of the reaction product from the autoclave to the holding vessel. This minimizes the structural damage to the reaction product during its transfer to the holding vessel. The holding vessel can, if desired, be used to mix additional material into the reaction product.

9 Claims, 2 Drawing Figures

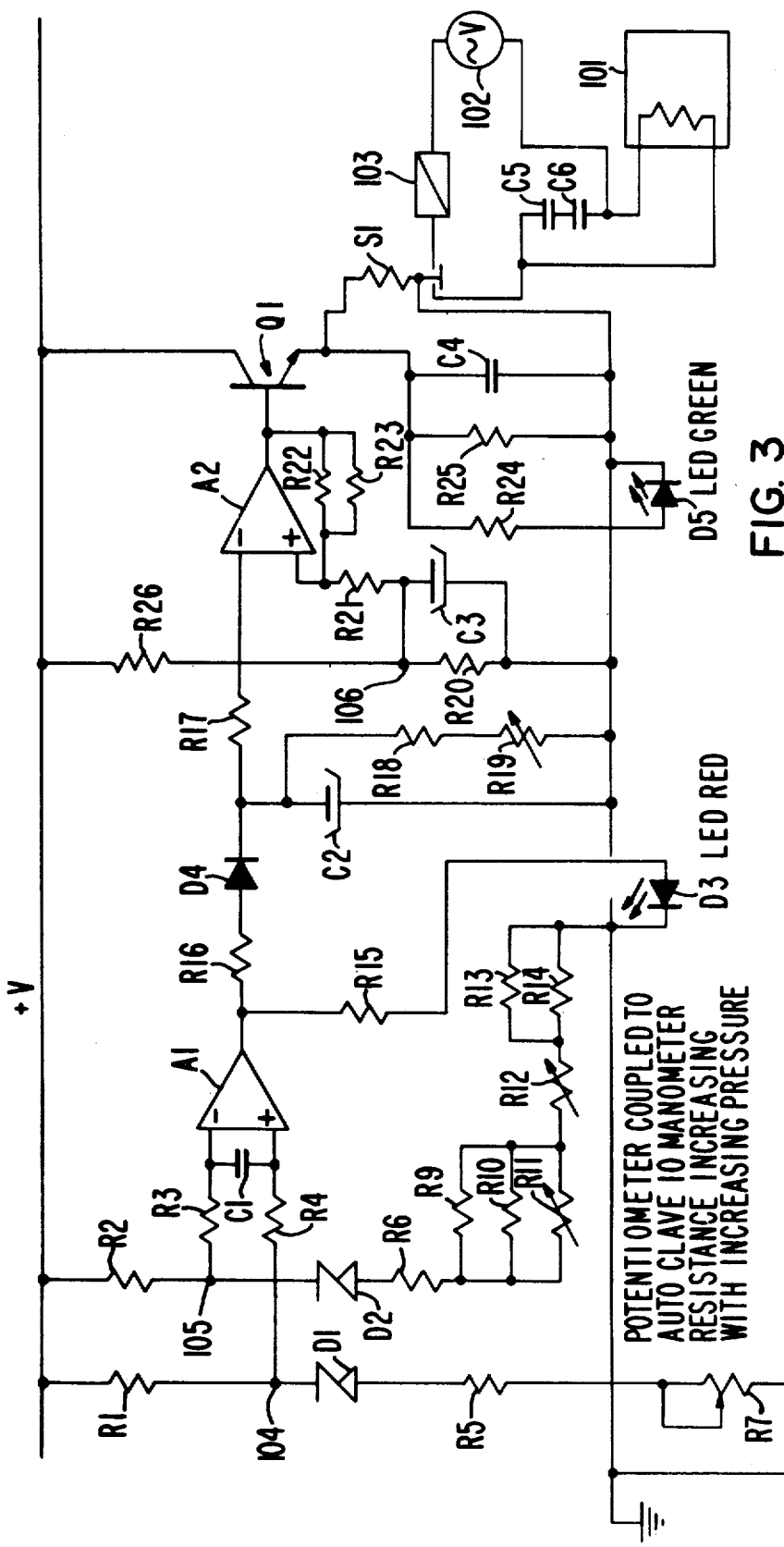

SYSTEM FOR FORMING A REACTION PRODUCT SUCH AS CALCIUM SILICATE

This is a division of application Ser. No. 12,886 filed Feb. 18, 1979 now U.S. Pat. No. 4,238,240.

BACKGROUND OF THE INVENTION

1. Field of the Invention

This invention relates to a method of forming a reaction product such as calcium silicate, structure employed in the method for forming this reaction product, and the resulting reaction product.

2. Prior Art

Shaped calcium silicate insulation is widely used, particularly for applications involving temperatures above 800° fahrenheit. A variety of processes for forming calcium silicate insulation products are known. For example, U.S. Pat. Nos. 3,988,419, 2,699,097, 2,904,444, and 3,001,882 disclose methods for forming calcium silicate insulation. As disclosed in the '882 patent, the calcium silicate insulation typically is composed of crystals of synthetic tobermorite and/or xonotlite prepared by the induration of aqueous lime-silica slurries in which the molar ratio of lime-silica falls in the range of about 0.65:1 to 1:1 and the water-to-solids ratio falls between about 0.75:1 to about 9.0:1. Typically, in the preparation of low density insulation (i.e., densities ranging from about 5 to 15 lbs. per cubic foot) asbestos fibers have been added as a reinforcing material to the slurry. A description of certain prior art techniques for producing molded materials of calcium silicate is described in U.S. Pat. No. 3,679,446 on an application of Kubo. Kubo states that it is difficult to obtain calcium silicate insulation products with uniform properties and satisfactory mechanical strength unless the induration reaction is conducted for a long period of time. Kubo further states that the calcium silicates typically produced cannot satisfactorily withstand high temperatures with the result that a calcium silicate product composed mainly of tobermorite crystals is liable to decrease in mechanical strength markedly at 650° C. or thereabout and to disintegrate or break down at over 700° C. and that a product composed mainly of xonotlite crystals tends to decrease in mechanical strength markedly at a temperature higher than about 1000° C. Kubo discloses a method of forming calcium silicate crystals wherein at least a given percent by weight of the calcium silicate crystals has formed therein "numerous small agglomerates of a diameter of ten to 150 microns by being three dimensionally interlocked with one another," said agglomerates being dispersed in water "in substantially globular form." Kubo also discloses the use of reinforcing fibers formed predominantly of pulp fiber.

Hoopes and Weber disclose in U.S. Pat. No. 3,736,163 the formation of calcium silicate insulating material having densities on the order of 10 to 15 lbs. per cubic foot wherein asbestos reinforcing fibers are replaced by a reinforcing fiber comprising from about three percent to fifteen percent of the weight of the calcium silicate material and consisting of nodulated mineral wool and cellulosic fiber, at least about twenty-five percent of the fiber being nodulated mineral wool.

In the manufacture of calcium silicate products in accordance with the prior art, the reaction constituents (typically calcium oxide (CaO) or hydrated calcium oxide $Ca(OH)_2$) are mixed with a siliceous material, such as sand, in water to form a slurry. This mixture is heated in an autoclave to form a variety of crystalline forms of calcium silicate depending upon the temperature, pressure, length of reaction time and water concentration used. Fibrous materials such as asbestos, which are not adversely affected by the reaction conditions, may be incorporated into the mixture prior to processing. The reaction product of this processing is generally an aqueous slurry of hydrated calcium silicate crystals intermixed with desired fibrous components. This slurry is then cast into molds and dried, usually by heating, to form the desired finished shaped objects.

As discussed in the Zettel U.S. Pat. No. 3,816,149, this processing to form the crystalline materials in the slurry is time consuming and requires large and expensive pieces of processing equipment. Thus the prior art has attempted to improve the process conditions under which crystallization takes place and to shorten the time required to produce a finished hydrate. Decreasing the time to process the slurry through crystallization and the return to ambient conditions results in more efficient and economical utilization of the equipment and an increased output of finished product.

In the prior art typically the slurry was cooled in the autoclave upon completion of the crystallization. The pressure was then reduced within the autoclave while the slurry was cooled to ambient. The prior art recognized that allowing the steam pressure in the autoclave to be reduced by cooling was both slow (because of the long time required to transfer heat from the slurry through the autoclave walls to the ambient) and inefficient (because of the waste of the heat so transferred). To speed up the process, the high pressure steam in the autoclave was vented to the atmosphere. Because at atmospheric pressure the crystalline reaction of the components in the slurry proceeds at a temperature well above the boiling point of water, the venting of steam to the atmosphere caused the hot aqueous slurry to boil violently. This fractured many of the newly formed crystals thus defeating the purpose of the careful prior crystallization. Moreover, the venting of steam wasted energy. As disclosed in U.S. Pat. No. 3,816,149, Zettel attempted to overcome these problems by hydrothermally reacting a highly concentrated aqueous slurry of a source of calcium oxide and a siliceous material in the presence of saturated steam under elevated pressure in a pressure vessel to form crystalline calcium silicate. Following the formation of the crystalline calcium silicate hydrate, the steam input was halted and low temperature water was gradually added to the reaction mixture within the pressure vessel until sufficient water was added to dilute the crystalline slurry to the desired concentration for subsequent molding operations. Incoming water condensed the steam in the pressure vessel simultaneously reducing its pressure and cooling the crystal-containing slurry. The gradual cooling nd depressurization was described by Zettel as effectively eliminating the disruption of the crystal structure. Zettel also reduced substantially the time required to raise the reaction mixture from ambient to the condition for the crystallization reaction to take place by reducing the amount of water present which must be heated compared to the then prior art processes.

Calcium silicate insulation produced by the prior art still leaves much to be desired in the way of strength, high temperature insulation capability, predictability of characteristics, machineability, and dimensional consistency. In addition, the manufacturing process for this material still wastes considerable energy by heating and cooling the reaction slurry in the autoclave. This process also increases the cost of forming insulation by tying up the equipment for a long period of time per batch of calcium silicate formed. Finally, during the transfer of the calcium silicate reaction product from the autoclave to a holding tank for the next stage in the operation, the crystalline structure of the reaction product fractures or is otherwise changed.

SUMMARY OF THE INVENTION

This invention overcomes many of the problems of the prior art methods of forming a reaction product such as calcium silicate in an autoclave. In accordance with this invention, reaction constituents such as silicon dioxide and calcium oxide, are mixed with water in the autoclave and then heated to a selected temperature for a selected time. Heat increases the pressure in the autoclave to a selected level and the reaction takes place over a desired period of time. At the end of this time, the contents of the autoclave are transferred from the autoclave to another vessel connected by a flow passage to the autoclave. The transfer is carried out in one embodiment by maintaining the pressure in the autoclave a selected and substantially fixed amount above the pressure in the receiving vessel during the transfer operation.

In one embodiment of this invention, the contents of the autoclave are transferred to the other vessel through a heat exchanger thereby to transfer a portion of the heat in these contents to another material thus to decrease the net amount of energy used in forming the reaction products. This other material is, in one embodiment, water which is a reaction constituent to be used in the next batch of material to be placed in the autoclave.

The flow rate of the material from the autoclave through the flow passage is selected to ensure that the reaction products are not altered as a result of the flow process. This condition is met by a flow which is at least partly laminar and thus the Reynolds number of the reaction products through the flow passage is preferably less than the value at which the flow changes from laminar to turbulent. Satisfactory results have been obtained, however, when this flow is somewhat turbulent, but completely turbulent flow has been found to be detrimental to the quality of the final molded product.

The transfer of heat from the reaction products to the other material during the transfer of the reaction product from the autoclave to the holding vessel, is done at such a rate as to stabilize the reaction products in a desired form. When the reaction products comprise calcium silicate formed from a stochiometric mixture of calcium oxide (CaO or Ca(OH)$_2$) and silicon dioxide (SiO$_2$), the reaction products comprise crystals of xanotlite, tobermorite and other less well-defined hydrated forms of calcium silicate. Preferably, however, the reaction product is xonotlite. The heat transfer from the xonotlite to, for example, water, stabilizes the xonotlite crystals and helps prevent the fracture or rupture of these crystals as a result of the shearing and turbulence of the flow process.

In the vessel, fibrous materials such as mineral wool and wood pulp are added to the reaction products to give strength to the finished product. Typically, the mineral wool is added first followed by wood pulp. Both the mineral wool and the wood pulp are mixed substantially uniformly through the reaction products.

The reaction products from the vessel mixed with the fibrous material are then allowed to flow from the vessel to a dewatering station, typically a rotating drum upon which a vacuum is pulled. From the rotating drum the dewatered reaction products are then sent to a mold where a vacuum is additionally pulled and they are pressed to remove additional moisture and to form the reaction product into a desired shape such as a rectangular slab or a curved section. The molded products are then dried, preferably by infrared radiation, to remove additional moisture. The final product has a density of about 200 kilograms per cubic meter up to about 400 kilograms per cubicmeter and has been found particularly suitable for high temperature applications, i.e., temperatures above 1500° F. The molded product exhibits improved strength compared to prior art products and is machineable, if desired, thereby increasing the utility of the product. However, the final product preferably is molded to size in order to avoid any structural weaknesses that might be caused by machining and to avoid waste. The product also exhibits improved dimensional stability.

DESCRIPTION OF THE DRAWINGS

FIG. 2 illustrates an electronic circuit used to control the pressure of the autoclave 10 (FIG. 1) relative to the pressure in the vessel 12 (FIG. 1) in accordance with this invention; and FIG. 3 comprises a table illustrating the operation of the structure of FIG. 1 and the circuit of FIG. 2.

DETAILED DESCRIPTION

Figure 1:
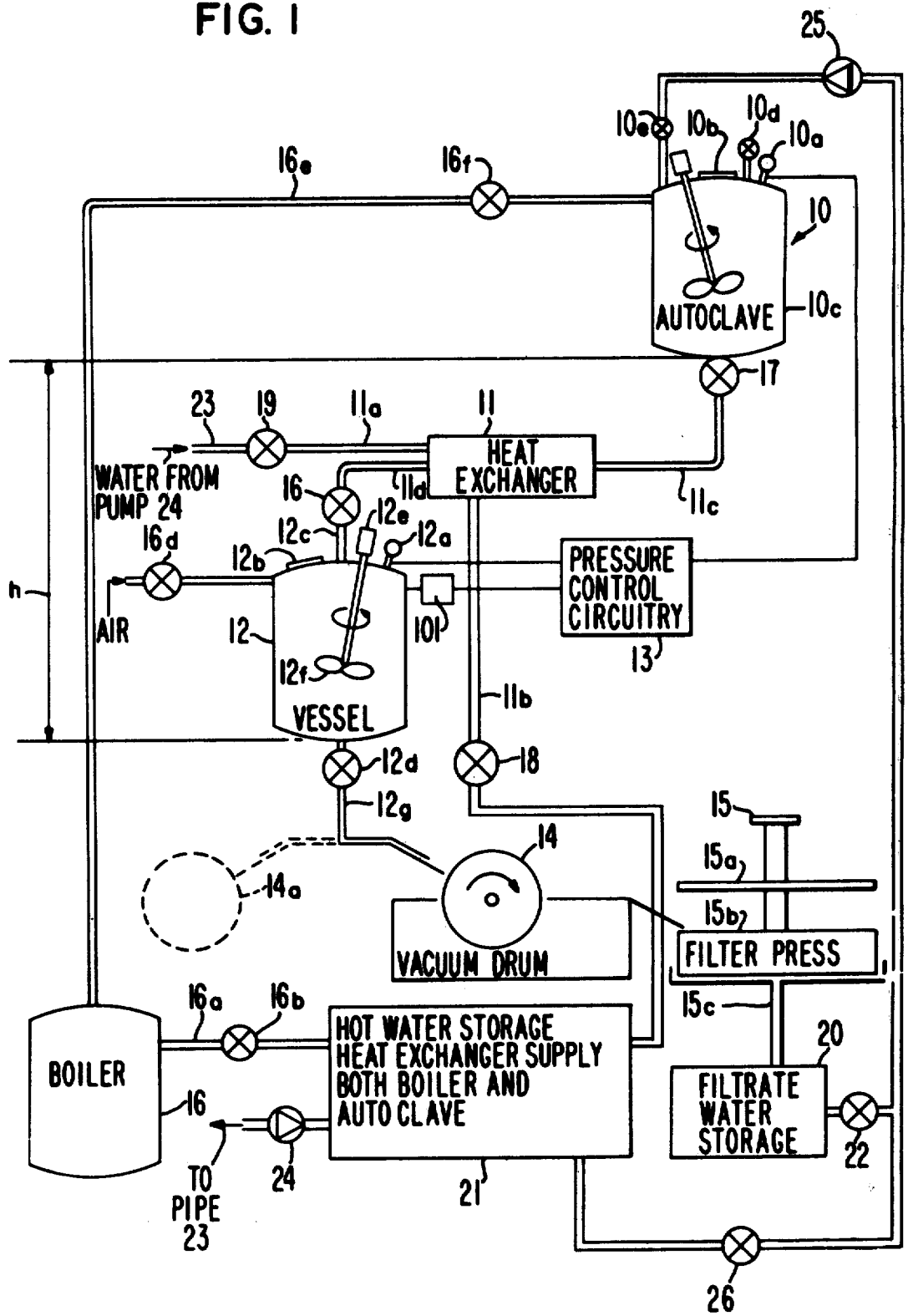
FIG. 1 illustrates schematically an arrangement of the several pieces of equipment used to practice the process of forming reaction products in accordance with this invention.

This invention will be described in relation to the reaction of calcium oxide or calcium hydroxide and silicon dioxide to form calcium silicate. However, certain principles of this invention can also be used in conjunction with other reactions requiring equipment of the same type as that described herein, particularly where it is desirable to insure that the reaction products are not fractured or altered as a result of the transfer of the products from the autoclave to another vessel. Furthermore, certain principles of this invention will also be applicable in other reaction processes where it is desired to reduce the net energy consumed in the process.

Turning to FIG. 1, the equipment used to illustrate the process in accordance with this invention is shown schematically. Autoclave 10, of a type well known in the art, comprises a pressure vessel capable of withstanding pressures at least in excess of from 15 to 25 bars absolute pressure. To form calcium silicate, calcium hydroxide (Ca(OH)$_2$) and powdered quartz (SiO$_2$) are placed in the autoclave and mixed with water so as to form less than about seven percent by weight of the total weight of water in the autoclave. Nothing else is added to the autoclave. Preferably calcium hydroxide in powder form is used rather than calcium oxide (quick lime) because powdered calcium hydroxide is free flowing and easily handled while being weighed and otherwise processed. On the other hand, calcium oxide is dangerous and difficult to handle. After the reaction constituents have been added to the autoclave 10, the autoclave is heated to between 176° C. and 240° C. and preferably to 197.4° C. at about 15 bars absolute pressure. (In this specification all pressures, unless otherwise indicated or obvious from their context, are intended to be absolute pressures.) At this pressure and temperature the steam in the autoclave is saturated. In accordance with this invention, the calcium oxide (or calcium hydroxide) and silicon dioxide are preferably added in the stochiometric ratio so as to have a ratio of one mole of calcium oxide for each mole of silicon dioxide. However, if desired, the lime/silica ratio can be varied from 0.65 to 1.0 to 1.2 to 1.0.

Prior to the addition of the calcium hydroxide and silicon dioxide to the autoclave 10, but after the addition of water, agitator 10c is turned on and is left on throughout the reaction to thoroughly mix the reaction products and to insure substantially uniform results.

The result of the reaction within the autoclave is the formation preferably of crystals of xonotlite. At the selected temperature and pressure (197.4° C. and 15 bar) the reaction typically must continue for in excess of about 55 minutes and preferably one hour and fifteen minutes but not in excess of one hour and forty-five minutes. Continuing the reaction time beyond 55 minutes (which is the approximate time needed to yield xonotlite crystals under the selected conditions) increases the size of the xonotlite crystals. Since, however, by one hour and fifteen minutes the crystals are already adequate for use in insulation, continuing the reaction beyond one hour and fifteen minutes merely wastes energy. This one hour and fifteen minutes is measured from the time after the reaction constituents are in autoclave 10 and manometer 10a has reached 15 bar absolute due to direct steam injection into autoclave 10.

The pressure in the autoclave 10 is controlled to within 15 bar ±1% bar using a conventional regulator of a type commercially available such as from Foxboro Instruments, for example. Because the steam in the autoclave 10 is saturated, maintaining the pressure at 15 bars absolute maintains the temperature at 197.4° C. Measuring pressure is preferable to measuring temperature because a pressure transducer responds rapidly to pressure changes while a temperature transducer such as a thermocouple is both slow and reflects only the temperature of the material imediately adjacent the transducer.

It is known that the reaction rate increases as the size of the particles of silicon dioxide decreases. Preferably in accordance with this invention the specific surfaces of the raw materials of calcium hydroxide and silicon dioxide are 18 to 22 square meters per gram while the distribution of particle size of both calcium hydroxide and silicon dioxide is such that 90 percent of the particles are smaller than one micrometer in diameter. The specific surface areas given are based upon the well known nitrogen absorption method. Lower specific surfaces of reaction products increase the reaction time whereas higher specific surfaces reduce the reaction time but increase the cost of the raw materials (working with gels is more costly than working with solid constituents of small particle size). Preferably the solid material content of the autoclave is in the range of one to seven percent of the water in the autoclave (six percent is preferable). Increasing the solids contents of the reaction products would increase both the reaction time and viscosity of the reactants, substantially increasing the discharge time of the autoclave.

Thus in accordance with this invention, when the raw material contains 72.4% of calcium oxide in calcium hydroxide of 95% purity and silicon dioxide of 94% purity, the weight amounts of calcium hydroxide and silicon dioxide can be calculated as a function of the necessary amount of water (denoted by "X") in the autoclave by the following equations in which n is the sum of the weights of calcium hydroxide and silicon dioxide expressed in percent of the total weight X of the water in autoclave 10 (i.e., $0 < n \leq 7\%$):

$1.2nX/220$ = weight of $Ca(OH)_2$ in kilograms (1)

$nX/220$ = weight of $SiO_2$ in kilograms (2)

$X$ = weight of water in kilograms (3)

For a stochiometric reaction, the weights of the reaction constituents in kilograms should be selected in accordance with the above equations. Impurities in water such as iron, chlorides, carbon dioxide, potassium and sodium should be kept to a minimum. Preferably these impurities should be no greater than 1.6 parts per million ("ppm") of calcium, 0.06 ppm of iron, 0.15 ppm of magnesium, 0.37 ppm of potassium and no traceable amounts of chloride, sodium and carbon dioxide on a parts per million basis.

Upon completion of the reaction, the reaction products are transferred from the autoclave 10 to holding and mixing vessel 12. The reaction products are passed through valve 17 and flow passages 11c, 11d, and 12c during this transfer as well as through heat exchanger 11. Heat exchanger 11 contains a material, typically water, which will be added to the next batch of reaction constituents to be placed in the autoclave 10.

The contents of autoclave 10 are transferred under pressure from autoclave 10 to vessel 12. The relative pressures of these two containers are controlled by pressure control circuitry 13 (shown in more detail in FIG. 2). In accordance with my invention, the pressure in vessel 12 is held beneath the pressure in autoclave 10 in a controlled manner (for example, by a constant amount) such that the reaction products flow from autoclave 10 to vessel 12 at a rate such that the crystals in the reaction product are not fractured or broken down. In one embodiment wherein the flow passage from autoclave 10 to vessel 12 through heat exchanger 11 was about 10 meters long and had an inside diameter of about 30 millimeters, the pressure difference between autoclave 10 and vessel 12 was about 1.5 bars maxiumum and preferably was 0.4 bars. Heat exchanger 11 removed enough heat from the reaction products that the temperature of the reaction products in vessel 12 was approximately 87° C.

A motor 12e is attached to vessel 12 to stir by means of an agitator 12f the reaction products in vessel 12 to insure that the reaction products in this vessel remain homogeneous and to allow the mixing of fibrous materials with these products. The flow of the reaction products from autoclave 10 to vessel 12 is, in one embodiment, assisted by the influence of gravity obtained by placing autoclave 10 above vessel 12 by the distance h. This placement however is not essential.

During the transfer of reaction products from autoclave 10 to vessel 12 the pressure in autoclave 10 drops. Agitator 10c continues to rotate (but at a slower rate) to prevent vortexing of the reaction products in autoclave 10 during the transfer. Control circuitry 13 operates to ensure that the pressure in vessel 12 likewise drops a sufficient amount to maintain the desired pressure difference between autoclave 10 and vessel 12. The way in which this is done will be described later. Upon completion of the transfer of the reaction products from autoclave 10 to vessel 12, autoclave 10 and vessel 12 are aproximately at atmospheric pressure. If not, air is released from vessel 12 to bring the pressure in vessel 12 to atmospheric pressure.

Fibrous material comprising preferably a mixture of mineral wool fibers of selected lengths substantially uniformly dispersed in water is then added through hatch 12b to vessel 12. Agitator 12f rotates slowly to thoroughly mix this mineral wool with the reaction products in vessel 12. Upon completion of this mixing which in one embodiment takes about five minutes, wood pulp fibers are then added to the reaction products in vessel 12 through hatch 12b. These cellulose fibers are first substantially uniformly dispersed through water and then added to vessel 12. Agitator 12f again thoroughly mixes the materials in vessel 12 to insure a substantially uniform dispersion of the fibrous material throughout the reaction products. Upon completion of the mixing, valve 12d is opened and the slurry contained within vessel 12 passes by gravity through pipe 12g into a pan from which it is picked up on the surface of rotating drum 14. Drum 14 comprises a rotating vacuum filtration unit containing a sieve drum which rotates as a cake of the reacted product forms on its outer surface. The moisture in the slurry is drawn out of the slurry by a vacuum drawn on the center of the drum and the solid material cakes on the surface of the drum. This cake is scraped from the drum and transmitted to the filter press 15.

Filter press 15, of a type well known in the art, presses the cake from drum 14 into a desired shape such as a slab or a curved segment. The cake is placed in the bed 15b of the press on a porous material. The pressure plate 15a (also called a "platen") is then brought down onto the top of the cake inside the bed 15b. The pressure created by plate 15a together with a vacuum drawn on the bottom of the cake forces water out the bottom of the filter press. This water passes through pipe 15c into a first hot water storage tank 20. By opening valve 22 and turning on pump 25 this water will be used to partly fill the autoclave 10 at the start of the next production cycle.

The clean hot water from heat exchanger 11 is stored in hot water storage tank 21 and is subsequently transferred to autoclave 10 and/or boiler 16. Two hot water storage tanks 20 and 21 are used because the water from filter press 15 has a Ph value of about 11 to 12 and thus should not be used in boiler 16. In one embodiment the water in heat exchanger 11 is recirculated through storage tank 21 by centrifugal pump 24. If the total iron, sodium, chlorine, potassium and magnesium concentrations in the water in tank 20 are above the minimum specifications for these impurities, this water will be discarded.

The above described procedure saves both energy and water, thus giving this process a substantial advantage over prior art processes. The use of hot water from heat exchanger 11 in boiler 16 (which provides steam to autoclave 10) additionally conserves energy and water.

EXAMPLE

The procedure followed to initiate the reaction in autoclave 10 in a pilot line constructed to implement the invention was as follows:

Thirty liters of water from heat exchanger 11 were passed into autoclave 10. Agitator 10c was then turned on to stir the water at a selected speed of about 90 RPMs. Then 10 liters of water with 1,091 grams of calcium hydroxide with a purity greater than 95 percent were added to autoclave 10 and stirred by agitator 10c. This was followed by the addition of 10 liters of water with 909 grams of silica dust (i.e., $SiO_2$) with a purity of greater than 94 percent well dispersed therein. During the filling of autoclave 10, valve 10d was opened to release air from the autoclave.

The water added to autoclave 10 was demineralized to enable the results of each run to be reproduced as exactly as possible. However, demineralization of the water is not necessary in normal production provided the characteristics of the water are known and thereby can be compensated for if necessary and further provided that the amounts of iron, chlorine, potassium, sodium and carbon dioxide are held in accordance with the above described specifications for these minerals. The impurities in the calcium hydroxide and silicon dioxide should preferably be on the order of the levels specified in the following table.

TABLE

| Impurity levels in $Ca(OH)_2$ | |
|---|---|
| CaO | 72.80% min |
| Combined $H_2O$ | 24.73% min |
| Free moisture | 0.18% max |
| Silica + insolubles | 0.37% max |
| Organic matter | 0.02% max |
| Ferric oxide $fe_2O_3$ | 0.06% max |
| Aluminum oxide | 0.03% max |
| Magnesium oxide | 0.15% max |
| Sodium oxide $Na_2O$ | 0.03% max |
| Potassium oxide $K_2O$ | 0.01% max |
| Chloride | 0.07% max |
| Sulphate | 0.54% max |
| Carbon dioxide $CO_2$ | 0.69% max |
| Total loss on ignition | 25.62% max |
| Calcium hydroxide $Ca(OH)_2$ | 95.00% min |
| Density | 0.663 gr/cc |
| Sieve | |
| Retained 100 mesh 0.31 | |
| Retained 200 mesh 0.73 | |
| Impurity levels in $SiO_2$ | |
| $SiO_2$ | 94% min |
| SiC | 0.2–0.7% max |
| $Fe_2O_3$ | 0.05–0.15% max |
| $TiO_2$ | 0.01–0.02% max |
| $Al_2O_3$ | 0.1–0.3% max |
| MgO | 0.2–0.8% max |
| CaO | 0.1–0.3% max |
| $Na_2O$ | 0.3–0.5% max |
| $K_2O$ | 0.2–0.6% max |
| M | 0.003–0.1% max |
| C | 0.002–0.005% max |
| Zn | 0.005–0.01% max |
| Ni | 0.001–0.002% max |
| S | 0.1–0.3% max |
| C | 0.2–1.0% max |
| P | 0.03–0.06% max |
| Loss on ignition (1000° C.) | 0.8–1.5% max |
| Density | 2.20–2.25 gr/cm$^3$ |
| Specific surface area | 18.0–22.0 m$^2$/gram |
| Particle size percentage | 90% is smaller than one micrometer |

When the autoclave was filled, valves 10d and 10e were closed and autoclave 10 was heated to 197.4° C. at an absolute pressure of 15 bars for one hour and fifteen minutes. While the heat was supplied by using electric heating elements, the preferred method is to inject steam into autoclave 10. During the heating process, agitator 10c remained on at 90 RPM. The optimum rotational rate of agitator 10c depends upon the size of autoclave 10. The pilot autoclave possessed an inner diameter of 40 centimeters and its cylindrical height was 40 centimeters. The outside diameter of the agitator 10c was 30 centimeters. At 90 RPM, autoclave 10 yielded a non-viscous reaction product. A lower RPM was found to yield a more viscous reaction product for the same reaction time while a higher RPM was found to be more likely to damage the crystals formed during the reaction process. Of course the optimum rotational speed of agitator 10c must be determined experimentally for an autoclave 10 of size different from that used in the pilot line.

During the reaction process, the air pressure in vessel 12 was increased to a pressure equal to or above the pressure in autoclave 10 by opening valve 16d to allow compressed air from a compressed air source (not shown) to enter vessel 12. Valve 16d was then closed and pressure control circuitry 13 was turned on. Agitator 12f in vessel 12 was also turned on. The reaction process continued for one hour fifteen minutes. At this time, transfer of the reaction products from autoclave 10 to vessel 12 was initiated by first opening valve 16 to allow compressed air to flow from vessel 12 through line 12c, valve 16, line 11d, line 11c, to poppet valve 17. Then poppet valve 17 was opened to initiate the transfer of the reaction product from autoclave 10 to vessel 12. As will be explained later, the pressure in vessel 12 is automatically brought to the proper level beneath the pressure in autoclave 10 by control circuit 13. As the pressure in autoclave 10 started to sink rapidly, the speed of agitator 10c was lowered to about 50 RPM to reduce the likelihood of vortexing in autoclave 10. Vortexing would allow the steam and air pressure within autoclave 10 to escape through valve 17 before all of the reaction product in autoclave 10 had been transferred into vessel 12.

Upon completion of the transfer, the vessel 12 was at atmospheric pressure and autoclave 10 automatically went to atmospheric pressure. Poppet valve 17 was then closed and an additional five liters of water was added to autoclave 10 and stirred by agitator 10c for two minutes to clean the interior of the autoclave. The cleaning water was then transferred to vessel 12 by opening poppet valve 17 and allowing this water, together with any residual reaction product, to flow into vessel 12.

Heat exchanger 11 had previously been filled with about 120 liters of water by opening valve 19 and closing valve 18. When filled with water, valve 19 was closed. The flow rate of the reaction products through the heat exchanger was selected so that the reaction products in vessel 12 had an average temperature between 85° C. and 90° C. and preferably about 87° C. Accordingly, the reaction products on the average dropped about 110° C. in passing through heat exchanger 11. Heat exchanger 11 was designed using well known techniques to obtain this 110° C. temperature drop for the selected pressure difference between autoclave 10 and vessel 12.

The reaction product (calcium silicate) in vessel 12 was then slowly stirred to insure uniform temperature.

Mineral wool and cellulose fibers were then added to the reaction products in vessel 12 in that order. These materials were not added to autoclave 10 because the high temperature and pressure in autoclave 10 combined with the high Ph value of about eleven of the reaction products in the autoclave would destroy the cellulose fibers. Even though mineral wool would not be destroyed, the addition to autoclave 10 of mineral wool would waste energy. Mineral wool fiber was added first as an aqueous solution in water between 80° C. to 90° C. and preferably at about 87° C. This mineral wool had previously been mixed in a blender for about ten (10) minutes to break down the fiber length of the mineral wool and disperse the mineral wool uniformly in the water. Any nodules in the mineral wool sedimented out at the bottom of the blender and were not added to the reaction product in vessel 12. The absence of nodules in the mineral wool fibers advantageously resulted in a substantially uniform structure. Preferably the mineral wool is obtained from a three-wheel spinner with a low shot content.

After the mineral wool was added to vessel 12, vessel 12 was stirred by agitator 12f for ten (10) minutes and then wood pulp, which had been uniformly dispersed through warm water at a temperature between 80° C. and 90° C. and preferably at about 87° C. by mixing in a blender for about ten (10) minutes, was added to the reaction products. (If the wood pulp is added prior to the mineral wool, the wood pulp thickens the reaction products in vessel 12 and makes it difficult to properly mix the mineral wool. However, the mineral wool when added first does not increase the viscosity of the slurry.) The mixture was stirred by agitator 12f in vessel 12 for about twenty (20) minutes at sixty (60) RPM. Typically, mineral wool by weight comprised 2.5 percent of the weight of the calcium hydroxide and silicon dioxide in the autoclave and the cellulose fibers by weight also comprised 2.5 percent of the original weights of the calcium hydroxide and silicon dioxide. The mineral wool and cellulose fibers gave mechanical strength to the reaction products when they were formed into slabs or molded products.

The wood pulp preferably was derived from unbleached Kraft paper which was flash dried on a sulfite basis. (Such paper is obtainable from Obbala in Finland.) The length of the wood fiber was not critical. During this mixing of the mineral wool and cellulose fibers in vessel 12, vessel 12 was at atmospheric pressure.

The reaction products in vessel 12 were removed from this vessel by opening valve 12d and pouring these products through pipe 12g onto a pan from which they were picked up by the surface of filtration drum 14. Filtration drum 14 preferably comprises a vacuum drum containing a metal screen of the type made by Sala in Sweden. A vacuum was drawn on the center of the drum to yield a pressure of about 0.22 bar and moisture in the cake formed on the outside face of the drum was drawn into the center of the drum and discharged. The cake was scraped off the drum and then passed to filter press 15 where additional moisture was removed under vacuum from the reaction products while the reaction products were molded into a desired shape. Typically, the reaction products (consisting of calcium silicate and more particularly xonotlite) flowing from vessel 12 were about six percent by weight solid. The cake on the surface of drum 14 had a moisture content controlled by the vacuum, the drum speed, and the cake temperature. The moisture content of the cake scraped from the drum was about 90 percent by weight at the scraper. The temperature of the cake coming off the drum was about 40° C. to about 50° C. By increasing (decreasing) the vacuum in the drum and slowing (increasing) the speed of the drum, the moisture content in the cake can be decreased (increased) as desired.

The cake in the filter press was then subjected to a vacuum on the bottom of the filter press to remove additional moisture. Typically, about 22 inches of mercury vacuum was drawn on the bottom of the filter press. The top surface of the cake in the filter press became dry and the platen 15a was then brought down on the top of this cake. At the moment the platen 15a touched the top of the cake, no additional pressure was applied for about 15 seconds. This allowed the vacuum to drain water from the cake while partially sealing the top of the cake with the platen. Then hydraulic pressure was applied to the platen for a few seconds to bring the pressure on the cake from zero to two bars in about 15 seconds. Two bars pressure was then applied for 30 seconds. Then in a step function the pressure was increased to about five bars for one minute. An additional step increase of pressure to 14 bars for three minutes was applied to the cake in the filter press and then the pressure was reduced to zero with the platen left on the resulting slab. The box surrounding the slab was then moved up at the moment the pressure reached zero and then the platen was released from the pressed slab. The slab was then removed from the filter press and the above sequence of steps was begun again.

END EXAMPLE

In an alternative and a preferred embodiment, the slurry is taken directly from vessel 12 to press 15 equipped with both top and bottom suction whereby the top suction setting is slightly higher than the bottom suction setting, (i.e., gravity is taken into consideration) to ensure uniform particle size distribution of the newly formed xonotlite agglomerates in the final product. This prevents unwanted curvature of the final product due to larger xonotlite particles settling to the bottom of the filter press in the slurry prior to the removal of water from, and the pressing of, the slurry. Total cycle time is substantially reduced by eliminating the rotating drum and delivering the slurry from vessel 12 directly into press 15. The press is electronically controlled using well known programming techniques to press the slurry into a slab by gradually stepping up the pressure in accordance with a preprogrammed sequence. Initially a pressure of about two (2) bars is applied for about thirty (30) seconds (this time can be varied if desired) and then a pressure of five (5) bars is applied for about one and a half (1.5) minutes. This is followed by a pressure of fourteen (14) bars for another two (2) minutes.

As a feature of this embodiment of the invention, the pressed product created by filter press 15 is removed from the filter press by applying a pressure to the top platen of the filter press so as to generate a slight positive pressure on the top surface of the product formed in the filter press just beneath the platen. As a result of this positive pressure, the product is gently removed from contact with the adjacent surface of the platen. The line through which the pressure is applied is not shown in the drawing but is the same line as is used to pull a vacuum on the top surface of the product for the removal of water.

To insure uniform quality product from autoclave 10, valve 17 is a poppet valve (of well known design) placed at the bottom of autoclave 10 so that the top surface of the poppet valve is flush with the bottom inside surface of autoclave 10. This insures that all reaction constituents in autoclave 10 are uniformly mixed and participate substantially equally in the reaction. To remove the reaction product from autoclave 10, the poppet valve 17 is driven upward into autoclave 10 to allow the reaction product in autoclave 10 to flow out of the autoclave through valve 17. Advantageously, poppet valve 17 allows the reaction product to flow cleanly and completely from autoclave 10.

To insure uniform quality of the reaction product, the raw material (calcium hydroxide and silicon dioxide) is kept in airtight sealed drums to prevent them from picking up impurities from the open air. It is particularly detrimental for the calcium hydroxide to pick up carbon dioxide because carbon dioxide distorts the crystalline structure of the calcium silicate end product.

It is well known that xonotlite converts to beta wollastonite at 865° C. This conversion results in the reaction product converting from $Ca_6Si_6O_{17}(OH)_2$ to $CaSiO_3$ and $H_2O$ (water). The water is dissipated from the structure. The removal of the bound water from the xonotlite crystal during the conversion process has very little effect on porosity but does result in dimensional stability when subsequently the product is brought up to a temperature in excess of 865° C. The heating of the insulation formed in accordance with this invention to 865° C. oxidizes the cellulose fibers in the insulation. These fibers actually oxidize at between 300° C. and 400° C. The result is an increase in the porosity of the calcium silicate insulation product from about 84% to 89% while simultaneously the permeability to gas of the insulation remains at about 0.01%. This low permeability and high porosity gives to this material its unique characteristics as an extremely efficient high temperature insulating material. Normally, when the density of an insulating material is increased, its thermal conductivity also increases. Trials with the material produced by the process of this invention, however, have shown that as its density increases, the thermal conductivity of the material goes up far less than would otherwise be expected based upon experience with prior art materials. Density depends on slurry quantity and press pressure.

As an added feature of this invention, the autoclave 10 and vessel 12 are made of stainless steel to reduce down time necessary to maintain and clean this equipment.

FIG. 2 illustrates the electronic circuit used to control the pressure difference between autoclave 10 (FIG. 1) and antipressure vessel 12 (also called the holding tank) during the transfer operation.

This circuit operates to control a magnetic pressure relief valve 101 on holding vessel 12 so as to maintain the pressure in vessel 12 a selected amount beneath the pressure in autoclave 10. The pressures in autoclave 10 and vessel 12 are sensed by potentiometers R7 and R8, respectively coupled to the manometers 10a and 12a attached to autoclave 10 and vessel 12, (FIG. 1) respectively.

Potentiometer R7 provides an increasing resistance with increasing pressure in autoclave 10. Potentiometer R8 provides a decreasing resistance with increasing pressure in vessel 12. Together with resistances R1 and R5 and zener diode D1, potentiometers R7 and R8 form a series connected current flow path between the voltage source +V (varying from 22 to 26 volts DC) and ground. Connected to node 104 between resistor R1 and zener diode D1 is one lead of a resistor R4, the other lead of which is connected both to a capacitor C1 and the positive or non-inverting input lead to operational amplifier A1. The inverting or negative input lead to amplifier A1 is connected to the other lead of capacitor C1 and one lead of resistor R3. The other lead of resistor R3 is connected to node 105 formed by resistor R2 and zener diode D2. The other lead of the zener diode D2 is connected to resistor R6 which in turn is connected in series with the parallel connected resistors R9, R10, R11 (R11 is a variable resistor), variable resistor R12, and the parallel connected resistors R13 and R14. Resistors R2, R6 and R12, together with zener diode D2, and the two groups of parallel connected resistors (R9, R10 and R11; and R13 and R14) form a second resistive divider network series connected between the positive voltage source +V and ground. Zener diodes D1 and D2 break down at about 2.4 volts.

The two voltage divider networks are arranged so that in the case where the pressure difference between autoclave 10 and vessel 12 is at a selected value (in one embodiment 0.4 bar), the input voltages on the inverting and non-inverting input leads of operational amplifier A1 are such that amplifier A1 produces a positive output signal of about 22 volts. The input voltage on the non-inverting input lead of amplifier A1 is determined by the setting of potentiometers R7 and R8 which are controlled by the settings or indications of the two manometers. These two potentiometers provide in the divider network between +V and ground a sum of resistances corresponding to the nominal difference is pressure desired between autoclave 10 and vessel 12. The degree of exactness of this correspondence depends upon the tolerances of the electronic components. When operated in accordance with the principles of this invention, autoclave 10 will be at a higher pressure than vessel 12 in order to initiate and sustain the transfer of the contents of autoclave 10 to vessel 12.

To keep this pressure difference between chosen limits, resistor R11 is set at about 45 ohms and resistor R12 is set in many cases—at about 3 ohms for the chosen nominal pressure difference of 0.4 bars. The effect of differences between nominal and actual values of the components in the circuit of FIG. 2 due to tolerances on component values is taken into account by empirically adjusting R11. Resistor R11 provides a range of coarse adjustment over 100 ohms.

The proper setting of resistor R11 enables adjustable resistor R12 to provide fine tuning within the desired range, i.e., the range of R11 is greater than the range of R12 to thereby provide respectively coarse and fine regulation of the desired pressure difference between autoclave 10 and vessel 12.

Neglecting component tolerances, R11 should be set in such a way that by adjusting R12 the resistance of the network consisting of R9, R10, R11, R12, R13, and R14 can be varied between 215 and 225 ohms to regulate the pressure difference between zero and 1.2 bars by varying the setting of R12 only. This ensures that the pressure in vessel 12 is beneath the pressure in autoclave 10 by a selected amount between zero to 1.2 bars. For the component values given infra, in the case when R12 is set at 3 ohms, this pressure difference is kept at about 0.4 bars during the transfer of the contents from autoclave 10 to vessel 12.

When the pressure difference between autoclave 10 and vessel 12 is sufficiently large (greater than 0.4 bars for the nominal case) the current through resistor R1 creates a voltage on the positive input lead of amplifier A1 larger in magnitude than the voltage on the negative lead of amplifier A1. The result is that amplifier A1 produces a positive output voltage. This positive output voltage is transmitted through resistor R16, diode D4, and resistor R17 to the negative or inverting input lead of operation amplifier A2. The output signal of amplifier A2 is thus negative relative to the output signal of operational amplifier A1 by about 20 volts, thereby turning off transistor Q1. Accordingly, no significant current passes through Q1 and the voltage on the emitter of Q1 is almost at ground level.

The positive output signal from amplifier A1 charges capacitor C2 to a selected voltage and produces a voltage drop across resistor R18 and variable resistor R19. The PC network comprising capacitor C2 and resistors R18 and R19 provides a time delay of about one second which, as will be seen shortly, decreases the oscillation frequency of the total system.

During the operation of the system, as the pressure in vessel 12 increases as a result of the contents of autoclave 10 transferring into vessel 12, the resistance provided by potentiometer R8 decreases. Likewise, as the contents of autoclave 10 transfer out of autoclave 10 into vessel 12, the pressure in autoclave 10 drops thereby decreasing the resistance of potentiometer R7.

This simultaneous decrease in the resistances of both potentiometers R7 and R8 increases the current passing through resistor R1 thereby lowering the voltage applied to the positive input lead of amplifier A1. As this voltage drops beneath the voltage on node 105 applied to the negative input lead of amplifier A1 (the voltage on node 105, in turn, is controlled by the settings of variable resistors R11 and R12) the output signal from amplifier A1 switches from a high level positive output signal of about 22 volts to a low level output signal with a potential slightly above ground. Light emitting diode D3 stops emitting light when the output signal from amplifier A1 switches from a high to low level. Diode D3 together with diode D5 (also a light emitting diode) and the two manometers serve to allow an operator to visually check the functioning of the system. Diode D4 prevents current from flowing from capacitor C2 back through resistor R16 to the output lead of amplifier A1 and thus prevents the activation of diode D3. Capacitor C2, however, discharges through resistors R18 and R19. The discharge time of capacitor C2 is determined by the one second RC time constant of the combination of capacitor C2 with the resistors R18 and R19 (this time constant can be varied as desired). As the voltage on capacitor C2 drops, so does the voltage on the negative input lead to amplifier A2. When this voltage drops beneath approximately +8 volts, the output signal from amplifier A2 switches from low level (slightly above ground) to a high level positive output signal thereby turning on and saturating previously switched off transistor Q1. Current then flows through transistor Q1 creating a current through the winding of relay switch S1 which turns on the electrically actuated valve 101. When open, electrically actuated valve 101 on holding vessel 12 releases gas from, thereby lowering the pressure in, this vessel. Sufficient pressure is released from vessel 12 to increase the resistance of R8 sufficiently to compensate for the decrease in resistance R7 due to the decrease in pressure in autoclave 10. As soon as the total series resistance of potentiometers R7 and R8 increases in value to raise the voltage on node 104 above the voltage on node 105, the output signal from amplifier A1 swings to its high level thereby driving the output voltage from amplifier A2 to a low level and thus turning off transistor Q1. This shuts pressure relief valve 101 on anti-pressure vessel 12 thereby preventing the pressure in this vessel from dropping beneath the pressure in autoclave 10 by more than the selected amount. The operation of this circuit continues to control the pressure difference between autoclave 10 and vessel 12 in the above manner, thereby allowing the transfer of the contents of autoclave 10 to vessel 12 in a controlled manner.

The existence of oscillation in the system during the transfer of the contents of autoclave 10 to anti-pressure vessel 12 can be seen by considering FIG. 3 in conjunction with FIG. 1. Assuming initially that transistor Q1 is off and valve 101 is thus closed, the pressure in autoclave 10 is above the pressure in vessel 12 by a selected amount determined by the settings of variable resistors R11 and R12 (mainly R12) shown in FIG. 2. As stated above, typically this pressure difference is about 0.4 bars. As the transfer proceeds, the pressure in autoclave 10 drops due to the departure of its contents and the pressure in vessel 12 rises due to the arrival of the reaction products in vessel 12. Consequently, the pressure difference ($\Delta P = P_{10} - P_{12}$ where $P_{10}$ is the pressure in autoclave 10 and $P_{12}$ is the pressure in vessel 12) between these two vessels drops as shown by the downward pointing arrow in the "$\Delta P$" column of step a of FIG. 3. Pressure control unit 13 (FIGS. 1 and 2) senses this drop and turns on transistor Q1 thereby opening valve 101 to release pressure from vessel 12. As a result, the pressure in vessel 12 drops as indicated by the downward pointing arrow in the column labeled "Pressure in vessel 12" in step b of FIG. 3. The pressure in autoclave 10 continues to drop as indicated by the downward pointing arrow in the column labeled "Pressure in Autoclave 10" in FIG. 3, and the pressure difference $\Delta P$ between these two vessels increases as shown by the upward pointing arrow in the "$\Delta P$" column of FIG. 3.

When the pressure difference $\Delta P$ between autoclave 10 and vessel 12 exceeds a selected magnitude, pressure control circuitry 13 detects this increase in the pressure difference and closes valve 101 thereby allowing the pressure in vessel 12 to build up again as the contents of autoclave 10 continue to transfer into vessel 12. Consequently, as shown in step c of FIG. 3, the pressure in autoclave 10 continues to drop, the pressure in vessel 12 increases and the pressure difference $\Delta P$ between these two vessels begins to decrease again. As the transfer continues, control unit 13 senses a decrease in the pressure difference between the two vessels beneath a selected amount, opens valve 101 thereby again lowering the pressure in vessel 12 and allowing the pressure difference $\Delta P$ to again increase. This cycling continues at a rate which is a function of the RC time constant of the circuit comprising capacitor C2 and resistors R18 and R19 shown in FIG. 2, the size of the orifice in release valve 101, and the flow rate of the reaction products from autoclave 10 to vessel 12.

From the above description, it is seen that the control system provided by the circuit of FIG. 2 operates in a binary fashion; that is, the pressure relief valve 101 on vessel 12 is either open, thereby releasing pressure from this vessel, or closed, thereby allowing pressure to build up in this vessel. Feedback between the two manometers R7 and R8 attached to the autoclave 10 and anti-pressure vessel 12 respectively is provided by the pressure in each of these two tanks. As the contents transfer from the autoclave 10 to the anti-pressure vessel 12, the pressure in autoclave 10 drops and the pressure in anti-pressure vessel 12 rises. Opening valve 101 releases gas from vessel 12 thereby allowing the difference in pressure between autoclave 10 and vessel 12 to rise. Closing valve 101 stops gas from being released from vessel 12 thereby allowing the pressure to build up in this vessel during the transfer of contents from autoclave 10 to vessel 12.

If desired, one can insure that the pressure in vessel 12 falls more rapidly when valve 101 is opened than it builds up due to the arrival of the contents from autoclave 10 by appropriately selecting the minimum orifice of valve 101 to allow the drop in pressure in vessel 12 to occur more rapidly than the build up of pressure in this vessel. In the limiting case, valve 101 will remain open during the whole transfer operation. In most situations, however, valve 101 is sized so that it will cycle open and closed several times during the transfer operation.

In an alternative embodiment, the electronic control signal can be replaced by a throttle valve or a valve and a vent pipe. At the start of the transfer operation, a suitable pressure difference can be established between autoclave 10 and pressure vessel 12. To start the transfer, the valve between autoclave 10 and vessel 12 is opened and simultaneously or subsequently, as desired, the pressure release valve on the top of vessel 12 is opened and left open during the transfer process. As a result, the reaction product from autoclave 10 flows into vessel 12 at an instantaneous rate determined by the instantaneous pressure difference between autoclave 10 and vessel 12. This pressure difference is controlled by the size of a vent pipe or the setting of the throttle valve. This embodiment avoids the use of a control circuit but has the potential disadvantage that the transfer is not as precisely controlled.

The transfer operation represents a balance of competing interests. To minimize the unwanted continuation of the reaction of the constituents in autoclave 10, the contents of autoclave 10 should be transferred to vessel 12 in a known but short time. Typically a time of ten to twelve minutes has been found practical both to minimize the continued reaction of these constituents and to increase the efficiency of the system by minimizing cycle time. Of course, longer transfer times can be designed into the system if desired. On the other hand, too rapid a transfer of the contents from autoclave 10 to vessel 12 results in a fracturing and a rupturing of the calcium silicate crystals. Accordingly, I have discovered that one can balance these two competing interests to yield a transfer rate which both decreases the total time necessary to process a batch of calcium silicate from the start of the reaction to transfer of the reaction product from autoclave 10 to vessel 12 and at the same time prevent the rupture or disassociation of the reaction product. Thus in accordance with my invention, the process is optimized to obtain efficient utilization of the equipment together with a reaction product which has predictable desired characteristics.

The structure described above allows the transfer of the contents of autoclave 10 to vessel 12 under a substantially constant pressure difference even as the pressure in autoclave 10 drops, thereby ensuring that the flow of the reaction products from autoclave 10 through the heat exchanger 11 occurs at a substantially controlled and constant flow rate such that the reaction products are not fractured or degenerated in a manner detrimental to the final characteristics of the reaction products. The length of the drain system comprising valve 17, pipes 11c and 11d, valve 16 and pipe 12c in FIG. 1 and the pressure difference is such that the flow rate of the reaction product during the discharge is selected to avoid degeneration of this product. The use of the heat exchanger to remove heat from the reaction product assists in stabilizing this product in a rapid manner during its flow from autoclave 10 to vessel 12 so that the final product made using the reaction product has a uniformity of characteristics previously unattainable. In one embodiment this is obtained by insuring that the Reynolds number of the flow products is substantially laminar (below the turbulent flow conditions which create unwanted shear forces on the reaction product). The Reynolds number of the flow products is beneath 4,000 and preferably about 200. However Reynolds numbers in the range of 200 to 600 have been employed with satisfactory results.

Comparative data of both Newtherm 950, a prior art calcium silicate insulation produced by Turner and Newalls in England, and the product made by the process of my invention (denoted Wictherm 1000) are given below.

| | 20° C. | 400° C. | 600° C. | 800° C. | 900° C. | 1000° C. |
|---|---|---|---|---|---|---|
| Flexural strength in bars* | | | | | | |
| Newtherm 950 | 5.5 | 6.1 | 6.8 | 7.2 | — | 7.4 |
| Wictherm 1000 | 20.1 | 22.5 | 29.4 | 22.5 | — | 16.7 |
| Compressive strength in bars** | | | | | | |
| Newtherm 950 | 1.5 | *** | *** | *** | — | *** |
| Wictherm 1000 | 9.7 | 10.9 | 2.9 | 2.6 | — | 2.0 |
| Shrinkage in % | | | | | | |
| Newtherm 950** | — | 0.44 | 1.15 | — | — | 8.25 |
| Wictherm 1000* | — | 0.87 | 1.07 | 1.77 | 1.82 | 3.05 |
| Corner-strength in bars** | | | | | | |
| Newtherm 950 | 34.3 | — | — | — | — | — |
| Wictherm 1000* | 210 | — | — | — | — | — |

*Measurements were obtained from samples at indicated temperatures.
**The measurements were obtained from samples that were heated to indicated temperatures and subsequently cooled down to room temperature.
***Not measurable, values smaller than 0.7 bar.

Also determined for Wictherm 1000 were porosity and K-factors (K is the heat transfer coefficient) with following results:

| Temperature in °C. | Porosity of Wictherm |
|---|---|
| 20° | 84.0% |
| 1000° | 89.4% |

| Temperature in °C. | K-value of Wictherm in K cal per hour, per meter degree centigrade (K cal hr$^{-1}$ m$^{-1}$ °C.$^{-1}$) |
|---|---|
| 20° | 0.07 |
| 300° | 0.11 |
| 600° | 0.17 |
| 900° | 0.22 |
| 1000° | 0.24 |

K-values were determined using the hot-wire method. Other K-values for Wictherm were obtained using the hot/cold face method and expressed in mean temperatures. Also shrinkages in length, width and thickness were determined, giving the following results:

| t in °C. (mean)* | k Kcal/m/h/°C. | t in °C. | % Shrinkage |
|---|---|---|---|
| 200° | 0.0555 | | 2.22% l |
| 400° | 0.0758 | Soaked at 1000°** | 2.19% w |
| 600° | 0.1055 | for 12 hours | 4.88% th |
| 800° | 0.1344 | | |

*The test was carried out according BS 1902 Part 1A, 1966
According BS 2972, 1975.*
***BS means "British Standard"

The values of the components shown in FIG. 2 used in the preferred embodiment of this invention are as follows:

| R1 | 1KΩ | C1 | 0.1 μF. ± 10% | 160V |
|---|---|---|---|---|
| R2 | 1KΩ | C2 | 47 μF. | 40V |
| R3 | 4.7KΩ | C3 | 4.7 μF. | 63V |
| R4 | 4.7KΩ | C4 | 0.1 μF. ± 10% | 400V |
| R5 | 100Ω | C5 | 0.1 μF. | 1000V |
| R6 | 100Ω | C6 | 0.1 μF. | 1000V |
| R7 | Potentiometer 215 Ohm | | | |
| R8 | Potentiometer 215 Ohm | D1 | Zenner 2.4V | |
| R9 | 100Ω | D2 | Zenner 2.4V | |
| R10 | 100Ω | D3 | LED (Red) | |
| R11 | Variable 100Ω | D4 | Signal Diode 1N4148 (Equiv. 1N914) | |
| R12 | Variable 10Ω | | | |
| R13 | 1KΩ | D5 | LED (Green) | |
| R14 | 220Ω | | | |
| R15 | 4.7KΩ | A1 | μA741(μA/LM741CN) | |
| R16 | 2.2KΩ | A2 | μA741(CA741CE, RCA) | |
| R17 | 2.2KΩ | | | |
| R18 | 10KΩ | Q1 | R52041 | |
| R19 | Variable 100KΩ | | | |
| R20 | 4.7KΩ | 1 V | 24 volts Varying from 22 to 26V DC | |
| R21 | 10KΩ | | | |
| R22 | 220KΩ | 101 | Electrically actuated relief valve (Herion, Germany) or any other type. | |
| R23 | 470KΩ | | | |
| R24 | 2.2KΩ | 102 | Voltage source 330V AC 50 Hz fuses 500V, 25A | |
| R25 | 22KΩ | | | |
| R26 | 10KΩ | 103 | Fuse 250V, 0.5A | |

All resistance values have a tolerance of ±5% Tolerances of C2, C3, C5, C6 and zener diodes are not critical.

While this invention has been described as operating with a substantially constant pressure difference between the pressure in vessel 12 and autoclave 10, it should be recognized that this pressure difference, can, if desired, be varied in accordance with a prearranged schedule, as a function of time.

It should also be recognized that the water from heat exchanger 11 can, if desired, be used for purposes other than a reaction constituent in the next batch of calcium silicate to be formed in autoclave 10. For example this water can be used as a source of heat or in other types of reactions.

As a feature of this invention, the density of the resulting calcium silicate insulation product can be varied by varying the pressure applied to a given amount of calcium silicate in filter press 15. The final density is determined by the filter press pressure and by the amount of calcium silicate in the slurry placed in filter press 15.

The final insulation product after drying typically contains between three to five percent by weight of water. It is not economic to further dry the calcium silicate insulation because it will merely absorb water from the atmosphere.

The above description is exemplary only and those skilled in the art will be able to implement other embodiments of the invention of this disclosure without departing from the claimed invention.

I claim:

1. A system for forming a calcium silicate reaction product comprising:
   an autoclave for receiving calcium hydroxide, silicon dioxide and water and for reacting these constituents to form a calcium silicate slurry;
   a holding vessel for receiving the calcium silicate slurry from said autoclave; means for mixing fibrous material with said calcium silicate slurry in said holding vessel;
   a flow passage connecting said autoclave to said holding vessel for allowing the passage of said slurry from said autoclave to said holding vessel;
   means for transferring heat from said slurry during its passage through said flow passage; and
   means for maintaining the pressure in said holding vessel a controlled amount beneath the pressure in said autoclave such that during the transfer of the slurry from said autoclave to said holding vessel there will be minimal structural damage to the slurry during its transfer to said holding vessel.

2. A system as in claim 1 wherein said flow passage for allowing the passage of said slurry from said autoclave to said holding vessel and said means for transferring heat comprise a flow passage with a heat exchanger formed adjacent to at least a portion of said flow passage thereby to allow a portion of the heat in said slurry to transfer to another medium.

3. A system as in claims 1 or 2 wherein said means for controlling the pressure in said holding vessel to a controlled amount beneath the pressure in said autoclave comprises:
   valve means mounted on said holding vessel;
   a first pressure transducer positioned and arranged to measure the pressure in said holding vessel and produce a first signal representative thereof;
   a second pressure transducer positioned and arranged to measure the pressure in said autoclave and produce a second signal representative thereof; and
   means responsive to said first signal and said second signal for controlling the position of said valve means on said holding vessel thereby to maintain the pressure in said holding vessel substantially at said controlled amount beneath the pressure in said autoclave.

4. A system for forming a reaction product comprising:
   an autoclave for use in forming said reaction product,
   a holding vessel for receiving the reaction product formed in said autoclave;
   a flow passage connecting said autoclave to said holding vessel,
   means for maintaining the pressure in said holding vessel in a controlled manner beneath the pressure in said autoclave during the transfer of the reaction product in said autoclave through said flow passage to said holding vessel; and
   means for removing a portion of the heat from said reaction product during the passage of said reaction product through said flow passage.

5. The system as in claim 4 wherein said means for maintaining comprises:
   means for detecting the pressure in said holding vessel and producing a first output signal representative thereof;
   means for detecting the pressure in said autoclave and producing a second output signal representative thereof; and
   means responsive to said first output signal and said second output signal for holding the pressure in said holding vessel a substantially constant amount beneath the pressure in said autoclave.

6. The system as in claim 4 wherein said means for removing a portion of the heat from said reaction product further comprises:
   means directly adjacent at least a portion of said flow passage for transferring a portion of the heat from the reaction product to a heat storage medium.

7. A system comprising:
   an autoclave for use in forming a reaction product;
   a holding vessel for receiving said reaction product;
   a pressure release valve on said holding vessel;
   a flow passage connecting said autoclave to said holding vessel; and
   means for controlling the pressure in said holding vessel to be no more than a first selected amount and no less than a second selected amount beneath the pressure in said autoclave.

8. A system as in claim 7 wherein said means for controlling comprises:
   means for detecting the pressure in said holding vessel and producing a first output signal representative thereof;
   means for detecting the pressure in said autoclave and producing a second output signal representative thereof; and
   means responsive to said first output signal and said second output signal for opening said valve to reduce the pressure in said holding vessel when the pressure in said holding vessel is less than said second selected amount beneath the pressure in said autoclave and for closing said valve when the pressure in said holding vessel is greater than said first selected amount beneath the pressure in said autoclave.

9. A system as in claim 8 wherein said means responsive to said first output signal and said second output signal comprises
   an electrical circuit for producing an output signal when the pressure in said holding vessel is less than said second selected amount beneath the pressure in said autoclave and for producing no output signal when the pressure in said holding vessel is greater than said first selected amount beneath the pressure in said autoclave;
   means connected to open and close said valve; and
   means for applying said output signal from said electrical circuit to said means connected to open and close said valve thereby to open said valve in response to said output signal and to close said valve during the absence of said output signal.

* * * * *